June 4, 1963 W. GEE, JR 3,092,011
COFFEE BREWER
Filed March 23, 1961 2 Sheets-Sheet 1

INVENTOR.
WILLIAM GEE JR.
BY Threedy & Threedy
HIS ATTORNEYS.

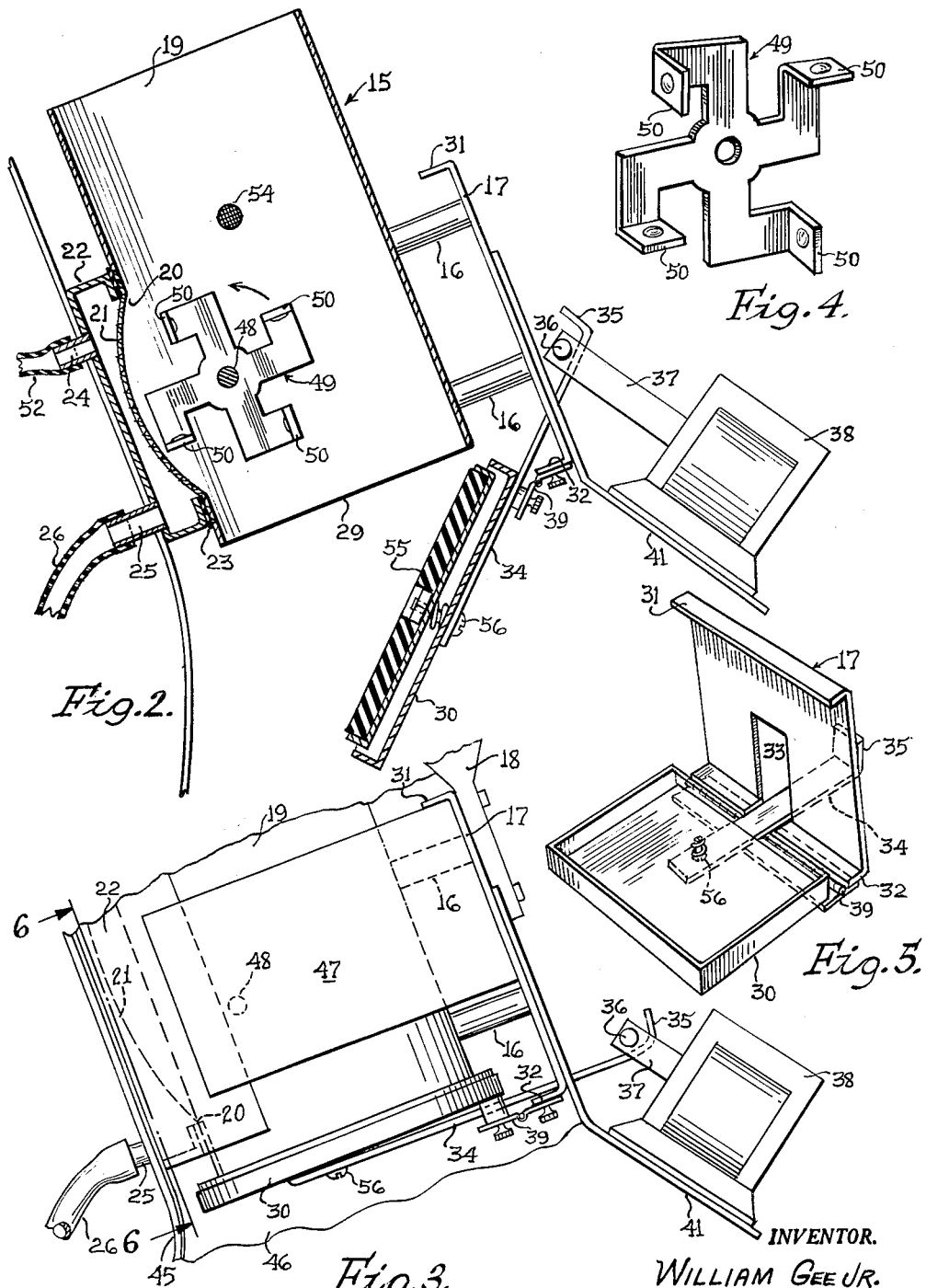

3,092,011
COFFEE BREWER
William Gee, Jr., 936 Hillside Drive, Island Lake, Ill.
Filed Mar. 23, 1961, Ser. No. 110,597
8 Claims. (Cl. 99—287)

This invention relates to a new and useful improvement in a coffee brewer and more particularly to a coffee brewer that is designed to brew a single cup of coffee and which can successfully brew successive cups of coffee without a distinguishable time delay.

A principal object of my invention is in the provision in an apparatus of this character of a method of supplying sequentially the necessary ingredients for producing a palatable cup of coffee.

Another object of my invention is in the provision in an apparatus of this character of an improved brewing chamber including a brewing agitator.

Yet another object of my invention is in the provision in an apparatus of this character of an improved coffee brewing agitator which also functions as an impeller for dispensing the brewed coffee from the brewing chamber.

A still further object of my invention is in the provision in an apparatus of this character of an electrically operated system of conditioning the brewing chamber for performing its desired function and for permitting the cleansing of the brewing chamber between each successive brewing cycle.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 2 is a fragmentary detailed sectional view showing the interior of the improved brewing chamber and agitator;

FIG. 3 is a fragmentary side elevational view of the brewing chamber in its operative or brewing condition;

FIG. 4 is a perspective view of the agitator and impeller as employed in this improved coffee brewer; and FIG. 5 is a perspective view of the coffee brewer door and its pivotal connection to a mounting bracket.

Figure 1:
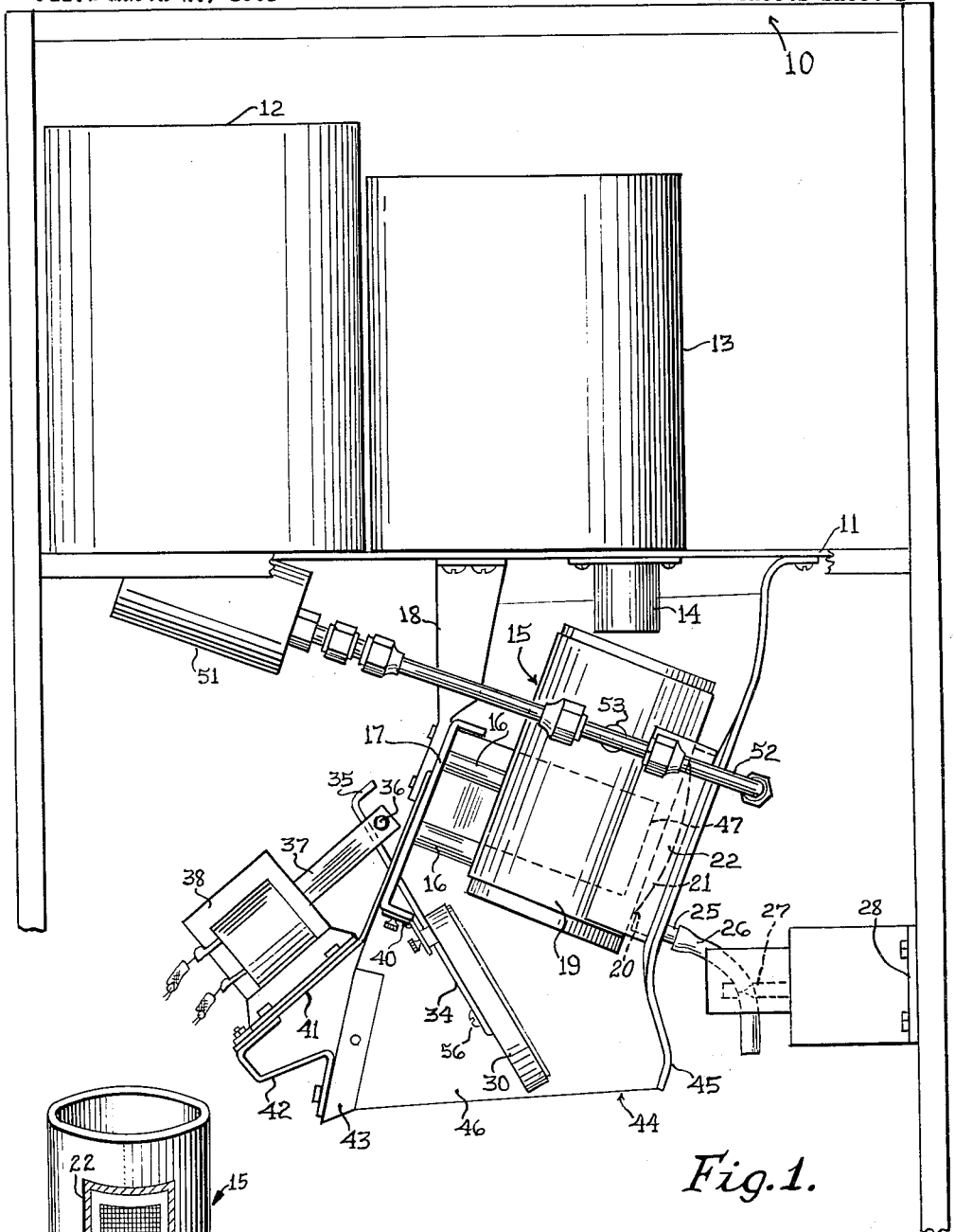
FIG. 1 is a fragmentary side elevational view of the improved coffee brewer in its normal or inoperative condition.

In my preferred embodiment of this invention I provide a suitable cabinet 10, shown fragmentarily in FIG. 1. Within the cabinet 10 on a shelf 11 provided thereby is supported a hot water tank 12. This hot water tank includes a commercial type electric heating element not shown and which makes up no part of the present invention. The electrical heating element is adapted to perform its normal function of maintaining the water within the tank 12 at a desired temperature.

Mounted on the shelf 11 adjacent the water tank 12 is a ground coffee dispensing hopper 13. This hopper may be of any construction such as that shown and described in either of the following patents: 2,149,270 dated March 7, 1959, or 2,907,265 dated October 6, 1959, and as such makes up no part of this present invention.

The function of the dispensing hopper 13 is to deliver into a funnel 14 a measured amount of coffee grounds for gravity discharge therefrom. The metered amount of coffee grounds from the hopper 13 will fall through the funnel 14 into a brewing chamber member 15 located adjacent the free end of the funnel 14 as seen in FIG. 1.

The brewing chamber member 15 is connected by supporting pins 16 to a mounting plate 17 which is in turn supported from beneath the shelf 11 by a mounting bracket 18. The preferred arrangement is such that the chamber 15 be angled acutely with respect to the front of the cabinet 10 for a reason hereinafter made apparent.

Figure 6:
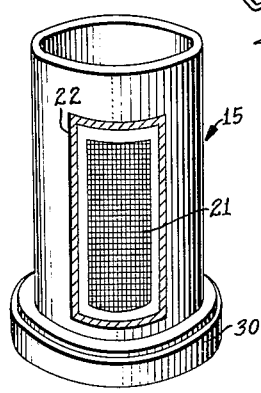
FIG. 6 is a front elevational detail sectional view taken on line 6—6 of FIG. 3 of the brewing chamber of my invention.

The brewing chamber member 15 is constructed in the form of a hollow cylindrical body 19 normally open at both ends. A portion of the wall of the body 19 has been cut away to provide an opening 20. This opening 20 is closed by an outwardly arcuated screen 21 as seen in FIG. 2. Over this screen 21 is positioned a cover plate 22, the longitudinal length of which is designed to conform to the curvature of the cylindrical body 19. This cover plate 22 is provided with a sealing gasket 23 so as to provide a seal cover for the elongated opening 20 see FIG. 6.

The cover plate 22 is provided near the top thereof with a water inlet port 24, while adjacent the bottom of the cover plate 22 there is provided an outlet port 25. This outlet port 25 has connection to delivery tube 26. This delivery tube 26 is associated with a solenoid-operated pinch valve 27 which in its normal position pinches the tube 26 so as to prevent passage of liquid therethrough. This solenoid-operated pinch valve 27 is mounted to the cabinet 10 by means of a mounting bracket 28 fixedly connected thereto as seen in FIG. 1. This solenoid-operated pinch valve 27 is of a construction and operation that is well known in the art and therefore such construction and operation thereof does not constitute a part of my present invention.

The brewing chamber member 15 is adapted to have its normally open bottom end 29 closed by a suitable door 30. This door 30 is hinged to the mounting plate 17 which also supports the brewing chamber member 15. As seen in FIG. 5 the mounting plate 17 is provided with laterally extending arms 31 and 32. The arm 32 as well as the portion of the body of the mounting plate 17 is notched out as at 33, for a purpose hereinafter made apparent. Extending beneath the bottom of the door 30 is a pressure support arm 34 which has a free end portion thereof adapted to extend through the notched out portion 33 of the mounting plate 17 as seen in FIGS. 1, 2, 3 and 5. As shown in FIG. 3 the support arm 34 is of an independent structure with respect to the door 30 and has but one end connected to the center of the door 30 by means of a nut and bolt arrangement 56 or the like, as seen in FIGS. 2 and 5. A spring is disposed between the door 30 and the nut so that the sealing gasket 55 hereinafter described is yieldably connected thereto. The free end of the arm 34 is hooked as at 35 about a pin 36 carried by the retractable arm 37 of an electric solenoid 38. The door 30 is pivotally connected to the arm 32 of the mounting plate 17 by hinges 39 and 40 which are mounted to the arm 32 and the bottom of the door 30 to either side of the support arm 34 as seen in FIG. 5.

The electric solenoid 38 is adapted to be carried by a mounting plate 41 supported by a bracket 42 carried by the back wall 43 of a closure member 44 which consists of the back wall 43, front wall 45 and side walls 46 (only one shown as in FIG. 1).

An electric motor 47 is mounted on the mounting plate 17 to one side of the brewing chamber member 15 as seen in FIGS. 1 and 3. This electric motor 47 by a shaft 48 rotatably supports a brewing agitator 49 within the cylindrical body 19 of the brewing chamber member 15. The agitator 49 is constructed in the form of a swastika having the ends of its arms thereof bent in one direction at right angles thereto so as to form impeller blades 50. These impeller blades 50 are adapted to pass over the inner face of the arcuated screen 21 when the electric motor 47 rotates the agitator 49 in an anti-clockwise direction about the shaft 48 as seen in FIG. 2.

Operatively associated with the hot water tank 12 is a solenoid water valve 51. This valve 51 is in turn associated with the brewing chamber member 15 through a conduit pipe 52. This conduit pipe 52 has its one end connected to the water inlet portion 24 hereinbefore described. The conduit pipe 52 is also provided with an extension 53 which terminates into a screen covered inlet port 54 provided in the side wall of the cylindrical body 19 of the brewing chamber member 15, as seen in FIG. 2.

In order to provide a proper seal for the body 19 when the door 30 is pivoted into its closing position, the door 30 is provided with a circular sealing gasket 55 which is adapted to engage the bottom opening 29 of the body 19.

The operation of my improved coffee brewer is accomplished through a suitable electric circuit not shown. The electric circuit may be initially energized through the actuation of a manually operated switch or through the actuation of a coin switch in the event that this coffee brewer is desired to be coin operated.

Upon energization of the electric circuit the solenoid 38 is energized pulling in the arm 37 thereof. By reason of the connection of the arm 37 with the free end portion of the support 34 the door 30 is pivoted about its hinges 39 and 40 into a position, where the sealing gasket 55 carried thereby, will close and seal the bottom of the body 19 of the brewing chamber member 15. When the arm 37 of the solenoid 38 is therefore pulled in through its full line of travel, the body of the support 34 between the end 35 and the screw connection 56, will be bent out of facial abutment with respect to the bottom of the door 30, thereby creating a compression force on the door 30 through the spring-urged screw connection 56. This compression force applied on the door 30 will maintain a leakproof seal of the open bottom 29 of the body 19.

After the open bottom 29 of the brewing chamber 15 is closed by the door 30, the solenoid water valve 51 will be energized emitting water into the body 19 through the water inlet ports 24 and 54. Simultaneously the proper amount of coffee grounds will be dispensed from the hopper 13 through the funnel 14 into the brewing chamber member 15. The electric motor 47 will be energized causing rotation of the agitator 49. When the proper amount of water has been introduced into the body 19 the solenoid water valve 51 will be de-energized. The motor 47 will continue to be energized through the brewing and dispensing cycle of the apparatus. The dispensing cycle will commence when the pinch valve 27 is energized, opening the dispensing tube 26. As the electric motor 47 is still energized the rotation of the agitator 49, through the presence of the impeller blades 50, will act as an impeller pump and will forcibly dispense the brewed coffee through the screen 21 and out the port 25 and into the dispensing tube 26 and from there to a suitable cup or the like. The screen 21 is of an extremely fine mesh such as "#165" and thus will retain the coffee ground in the brewing chamber member 15 after the brewed coffee has been dispensed therefrom.

After the cup of coffee has been brewed and dispensed from my coffee brewer the brewing chamber 15 must be cleaned so as to remove therefrom the coffee grounds. The rinse cycle commences upon the de-energization of the solenoid 38, opening the door 30, and the de-energization of the pinch valve 27, which again seals off the tube 26. The solenoid 38 is again energized sealing off the open bottom of the body 19 and the water solenoid valve 51 is energized permitting fresh hot water to be introduced through the conduit 52 and hence out of the inlet port 24 on to the screen 21 washing therefrom any coffee grounds which might have settled thereon. The fresh hot water will also pass into the body 19 through the inlet port 54 cleaning the inner wall thereof. The solenoid valve 51 as well as the solenoid 38 is de-energized thereby shutting off the water supply and again opening the door 30. The rinse water together with the coffee grounds will pass out of the body 19 and into a suitable waste receptacle not shown. The solenoid 38 is momentarily energized to quickly close and open the door 30 so as to cause the same to strike the chamber 15 to shake loose coffee grounds that may have adhered to the wall of the brewing chamber or the door itself. Simultaneously with the momentary closing of the door 30 the water solenoid 51 will be momentarily energized to release a shot of hot water 21 into the body 19 to achieve a second flush of the brewing chamber. When the door 30 opens to its normal position as shown in FIGS. 1 and 2 the last shot of water will pass therefrom into the waste receptacle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In an automatic coffee brewer the combination of a brewing chamber normally open at both ends and adapted to receive a charge of ground coffee through one open end thereof, said brewing chamber providing brewing liquid inlet ports and a coffee brew discharge port, an electrically operated valve means for sealing off the discharge port during the brewing of coffee in the brewing chamber; a pivotal closure for sealing the opposite open end of said brewing chamber prior to the reception of the ground coffee therein, means for pivoting said closure means into sealing position with respect to the opposite open end of said chamber, a source of heated brewing liquid, means for delivering the heated brewing liquid through the inlet ports into said chamber subsequent to the sealing of the opposite open end of said chamber and prior to and during the reception of the charge of ground coffee therein, a brewing agitator in said chamber, means for rotating said agitator within said chamber for mixing the ground coffee and heated brewing liquid into a coffee brew, and means provided by said agitator for discharging with a pump action the coffee brew through the discharge port.

2. In an automatic coffee brewer as defined in claim 1 wherein the means for pivoting said closure means into sealing position includes an electrically operated solenoid.

3. In an automatic coffee brewer as defined in claim 1 wherein the means for rotating said agitator within said chamber comprises an electric motor including a driven shaft extending into said chamber and upon which is fixedly carried said agitator.

4. In an automatic coffee brewer as defined in claim 1 wherein the means provided by said agitator for discharge with a pump action the coffee brew includes impeller blades.

5. In an automatic coffee brewer the combination of a brewing chamber normally open at both ends and adapted to receive a charge of ground coffee through one open end thereof, said brewing chamber providing brewing liquid inlet ports and a coffee brew discharge port, an electrically operated valve means for sealing off the discharge port during the brewing of coffee in the brewing chamber; a pivotal closure for sealing the opposite open end of said brewing chamber prior to the reception of the ground coffee therein electrically operated means for pivoting said closure means into sealing position with respect to the opposite open end of said chamber, a source of heated brewing liquid, means for delivering the heated brewing liquid through the inlet ports into said chamber subsequent to the sealing of the opposite open end of said chamber and prior to and during the reception of the charge of ground coffee therein, a brewing agitator wheel in said chamber, an electric motor for rotating said agitator wheel within said chamber for mixing the ground coffee and heated brewing liquid into a coffee brew, and impeller blades provided by said agitator wheel for discharging with a pump action the coffee brew through the discharge port.

6. A coffee brewing apparatus having a water supply and a coffee ingredient dispensing hopper operatively associated with a brewing chamber, said chamber comprising a body open at both ends, a movable closure for sealing one open end of said body, said body providing an inlet for the admission of water from the water supply into said body, said body having formed in the wall thereof a screened opening through which brewed coffee is forced, a cover plate carried by the wall of said body for sealing said screened opening, an outlet formed in said cover plate in spaced relation to said screened opening for discharging brewed coffee from said body, an agitator in said body adjacent said screened opening and rotatable through a vertical plane about a horizontal axis for mixing the water and coffee ingredients into a coffee brew within said body, means for rotating said agitator within said body, and means provided on said agitator when the same is rotated within said body for passing across the face of said screened opening so as to dispense with a pump action the coffee brew from said body into said outlet.

7. A coffee brewing apparatus as defined in claim 6 wherein the means for rotating said agitator within said body comprises an electric motor including a driven shaft extending into said body and rotatably supporting said agitator.

8. A coffee brewing apparatus as defined by claim 6 and in which said means provided on said agitator when the same is rotated within said body for passing across the face of said screened opening includes a plurality of impeller blades extending in a substantially perpendicular direction with respect to the screened opening when the same pass across the face thereof.

References Cited in the file of this patent
UNITED STATES PATENTS

| | | |
|---|---|---|
| 1,006,760 | Klein | Oct. 24, 1911 |
| 1,294,531 | Pennington | Feb. 18, 1919 |

FOREIGN PATENTS

| | | |
|---|---|---|
| 1,199,056 | France | June 15, 1959 |